April 3, 1951     J. W. BARNETT     2,547,433
FLOWER BED AND LAWN EDGE TRIMMER
Filed Jan. 31, 1947
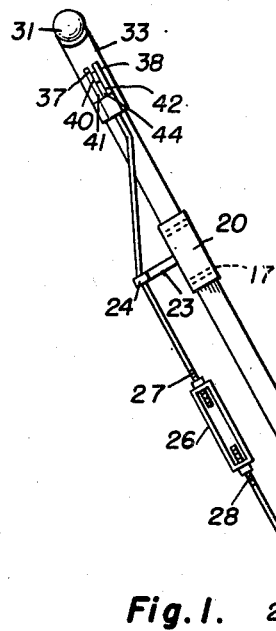
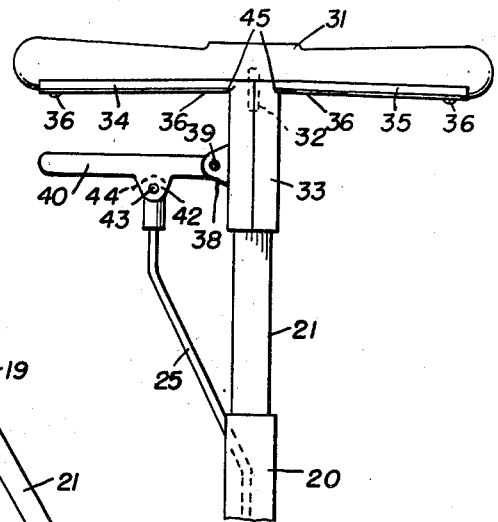
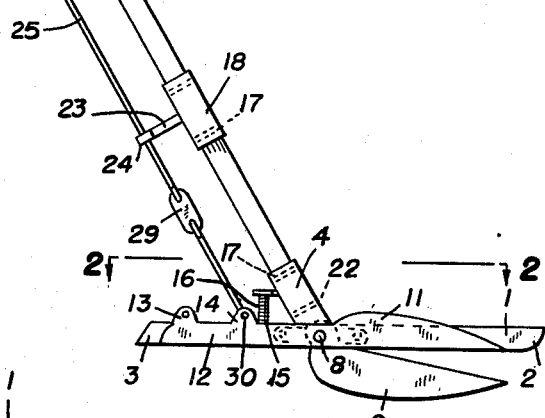
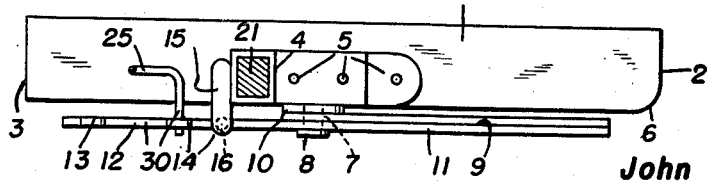
*Inventor*
John Willis Barnett Patented Apr. 3, 1951

2,547,433

UNITED STATES PATENT OFFICE 2,547,433

FLOWER BED AND LAWN EDGE TRIMMER

John Willis Barnett, Midland, Tex.

Application January 31, 1947, Serial No. 725,447

2 Claims. (Cl. 56—241)

This invention relates to improvements in flower bed and edge trimmers.

An object of the invention is to provide an improved form of implement for trimming flower beds and law edges adjacent thereto.

Another object of the invention is to provide an improved form and construction of flower bed and edge trimmer which will include a slidable body upon which a fixed cutter blade and a pivoted cutter blade are mounted, together with a handle for pushing said trimmer along a flower bed or edge, and a pivotally supported operating lever adjustably connected with said pivoted cutter blade whereby the grass adjacent the bed may be neatly and efficiently clipped.

A further object of the invention is to provide an improved form of flower bed and edge trimmer having its cutting blades disposed at the lower end of a handle and the operating means for said blades being disposed at the upper end of said handle.

Another object of the invention is to provide an improved flower bed and edge trimmer which will be highly efficient in operation, and relatively inexpensive to manufacture and produce.

Other objects will appear as the description proceeds.

In the accompanying drawings which form a part of this application,

Figure 1 is a side elevation of the improved flower bed and edge trimmer;

Figure 2 is a partial enlarged sectional view taken on the line 2—2 of Figure 1, and Figure 3 is an enlarged front elevation of the upper end of the handle with the pivotally supported cutter blade operating lever attached thereto.

Like characters of reference are used throughout the following specification and the accompanying drawings to designate corresponding parts.

In carrying out the invention, there is provided an improved form of flower bed and edge trimmer comprising a substantially rectangular shaped flat slide or body 1 having a rounded forward or lead edge 2, and rear or trail edge or end 3, the same being made from light metal or wood, or from any other desired material.

A split ferrule or collar 4 is formed on or secured to the upper surface of the slide or body 1, extending upwardly and rearwardly therefrom at a slight angle, as illustrated in Figure 1 of the drawings.

A plurality of securing fasteners 5 will be extended through the ferrule 4 and the body 1, as clearly shown in Figure 2 of the drawings. The right-hand front corner 6 of the slide or body 1 is rounded off to serve as a guide for directing the grass to the side in line with the clipper blades as slide or body moves along the ground.

A laterally extending bearing member or stub shaft 7 is supported at the side of the slide or base 1, and is formed with the disc-shaped head 8 upon its outer end.

A fixed lower cutter blade 9 is mounted upon the stud or stub shaft 7 adjacent the washer 10, being held in fixed position in any desired manner, said blade 9 extending at a forwardly sloping angle below the lower surface of said slide or body 1.

A cutter blade 11 is pivotally mounted upon the same stud or stub shaft 7 exteriorly of said fixed blade 9, and is provided with an integral rearwardly extending operating arm 12 upon the upper end of which the spaced apertured upstanding bearing ears 13 and 14 are formed.

A laterally extending bracket arm 15 is formed on the ferrule or collar 4, and supports a coil tensioning spring 16 which bears upon the upper edge of the arm 12 for raising the pivoted cutter blade 11 after the same has been closed or operated.

A plurality of guide ferrules 18, 19 and 20 are disposed about the handle 21, being held thereon by means of the cross bolts 17, the handle 21 being secured in the split socket or ferrule collar 4 by means of the cross bolts 22. The guide ferrules are provided with the offset arms 23 terminating in the aligned guide eyes 24 through which the pivoted cutter blade operating rod 25 will be slidably and reciprocably supported.

A turn buckle 26 is disposed between adjacent threaded ends 27 and 28 of the cutter blade operating rod 25, while a link 29 will be connected between the adjacent ends of the cutter blade operating rod 25 near its lowermost end, with the extreme lower end of said rod 25 being bent laterally as at 30 to extend to and through either of the apertured bearing ears 13 and 14 formed upon the rear portion of the operating arm 12, said ears being formed integrally with the rearwardly extending portion 12 of the pivoted cutter blade 11.

A cross handle 31 is mounted at the upper end of the handle 21, and is attached thereto by means of the dowel pin 32.

A split ferrule or collar 33 is also disposed about the upper end of the handle 21, and has welded thereto at 45 the opposed laterally extending arcuate bracing arms 34 and 35, which are attached to the cross handle 31 by means of the fasteners 36.

A pair of spaced laterally extending apertured bearing ears 37 and 38 are formed on the split ferrule or collar 33 and support the bearing pin 39 upon which the inner end of the cutter blade operating lever 40 will be supported for pivotal movement.

Spaced depending apertured bearing ears 41 and 42 are integrally formed on the lower edge of the lever 40 midway of its ends, and supports a pivot or bearing pin 43, upon which is mounted the apertured bearing ear 44 fixed upon the upper end of the cutter blade operating rod 25, whereby when the lever 40 is moved toward the cross handle 31, the pivoted cutter blade 11 will be closed or operated.

From the foregoing description, it will be apparent that adjustments may be readily made not only in the tension of the coil spring seating upon the upper edge of the rearwardly extending portion 12 of the pivoted cutter blade 11, but also the angular movement of the pivoted cutter blade may be varied as desired.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. An edge trimmer comprising an elongated flat slide plate having a leading edge and a trailing edge, a ferrule formed on the upper surface of said plate and extending upwardly and rearwardly therefrom, a handle secured to said ferrule, a bearing member extending laterally from the plate adjacent to the ferrule, a cutter blade fixed on said member and disposed perpendicular to the plate, said fixed cutter blade lying in a plane below the plane of the plate, a movable blade pivotally disposed at one of its ends on the bearing member and disposed in cooperative parallelism with the fixed blade, an operating arm on the movable blade, said arm projecting toward the trailing edge of the plate and having an apertured ear extending therefrom, an operating member secured to said ear for moving the movable blade about its pivot and into cutting engagement with the fixed blade, guide means for the operating member on said handle, an operating lever receiving said operating member and pivotally mounted on the handle at the upper end thereof, a bracket carried by the ferrule and overlying the operating arm and resilient means mounted between the bracket and operating arm for urging the movable blade upwardly to a position in alignment with the plate.

2. An edge trimmer comprising an elongated flat slide plate having a leading edge and a trailing edge, a ferrule formed on the upper surface of said plate and extending upwardly and rearwardly therefrom, a handle secured to said ferrule, a bearing member extending laterally from the plate adjacent to the ferrule, a cutter blade fixed on said member and disposed perpendicular to the plate, said fixed cutter blade lying in a plane below the plane of the plate, a movable blade pivotally disposed at one of its ends on the bearing member and disposed in cooperative parallelism with the fixed blade, an operating arm on the movable blade, said arm projecting toward the trailing edge of the plate and having an apertured ear extending therefrom, an operating member secured to said ear for moving the movable blade about its pivot and into cutting engagement of the fixed blade, guide means for the member on said handle, an operating lever receiving said operating member and pivotally mounted on the handle at the upper end thereof, a bracket carried by the ferrule and overlying the operating arm and resilient means mounted between the bracket and operating arm for urging the movable blade upwardly to a position in alignment with the plate, said leading edge of the plate being rounded at the forward edges of the blades and forming a guide to direct blades of grass toward the blades.

JOHN WILLIS BARNETT.

REFERENCES CITED

The following references are of record in the file of this patent:

UNITED STATES PATENTS

| Number | Name | Date |
|---|---|---|
| 391,742 | Gridley | Oct. 23, 1888 |
| 818,510 | Aldrich | Apr. 24, 1906 |
| 890,279 | Hoare | June 9, 1908 |
| 1,200,567 | Yeakel | Oct. 10, 1916 |
| 1,891,694 | Svendsgaard | Dec. 20, 1932 |
| 2,236,955 | Thompson | Apr. 1, 1941 |